US009854538B2

(12) United States Patent
Kishiyama et al.

(10) Patent No.: US 9,854,538 B2
(45) Date of Patent: Dec. 26, 2017

(54) BASE STATION, USER TERMINALS AND WIRELESS COMMUNICATION METHOD

(71) Applicant: Agency for Science, Technology and Research, Singapore (SG)

(72) Inventors: Yoshihisa Kishiyama, Tokyo (JP); Kazuaki Takeda, Tokyo (JP); Jian Zhao, Singapore (SG); Zhongding Lei, Singapore (SG); Francois Po Shin Chin, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 14/908,905

(22) PCT Filed: Jul. 29, 2014

(86) PCT No.: PCT/JP2014/069962
§ 371 (c)(1),
(2) Date: May 18, 2016

(87) PCT Pub. No.: WO2015/016226
PCT Pub. Date: Feb. 5, 2015

(65) Prior Publication Data
US 2016/0278023 A1    Sep. 22, 2016

(30) Foreign Application Priority Data

Jul. 29, 2013 (JP) ................................. 2013-156567

(51) Int. Cl.
*H04W 52/24* (2009.01)
*H04W 16/26* (2009.01)
(Continued)

(52) U.S. Cl.
CPC ......... *H04W 52/243* (2013.01); *H04W 16/26* (2013.01); *H04W 52/242* (2013.01); *H04W 52/42* (2013.01); *H04W 88/08* (2013.01)

(58) Field of Classification Search
CPC . H04W 52/243; H04W 52/242; H04W 52/42; H04W 16/26
See application file for complete search history.

(56) References Cited

U.S. PATENT DOCUMENTS

2008/0299955 A1* 12/2008 Lee ....................... H04W 72/14
455/414.1
2009/0202020 A1* 8/2009 Hafeez ................... H04B 7/022
375/299
(Continued)

FOREIGN PATENT DOCUMENTS

JP    2002252619    9/2002
JP    2009246974    10/2009
(Continued)

OTHER PUBLICATIONS

Huawei, Discussion on Side Condition and Maximum Size of CRM for CoMP, 3GPP TSG-RAN WG4 (Aug. 6, 2012), http://www.3gpp.org/ftp/tsg_ran/WG4_Radio/TSGR4_64/Docs/R4-124099.zip.

*Primary Examiner* — Wesley Kim
*Assistant Examiner* — Dong-Chang Shiue
(74) *Attorney, Agent, or Firm* — K. David Crockett, Esq.; Niky Economy Syrengelas, Esq.; Crockett & Crockett, PC

(57) ABSTRACT

The objective of the invention is to suppress, in a case of applying the RRH system in an environment having a plurality of cells (multi-cellular environment), the reduction of the throughput of the whole system. A base station, in the RRH system in which a plurality of antenna ports are dispersively placed in each of a plurality of cells, comprises: a selection unit that selects antenna ports, to which user terminals are to connect, from among the antenna ports of (Continued)

the cells in which the user terminals are existent; and a power setting unit that controls the transmission powers of the antenna ports. The selection unit and power setting unit set predetermined conditions for the target SINRs(t) of the user terminals and the transmission powers of the antenna ports, and select the antenna ports for the user terminals and control the transmission powers of the antenna ports such that the smallest one of the values of the SINRs of the user terminals of the plurality of cells is maximized.

5 Claims, 11 Drawing Sheets

(51) Int. Cl.
*H04W 52/42* (2009.01)
*H04W 88/08* (2009.01)

(56) References Cited

U.S. PATENT DOCUMENTS

| | | | | |
|---|---|---|---|---|
| 2011/0070918 A1* | 3/2011 | Hafeez | ................ | H04B 7/0452 455/522 |
| 2012/0149411 A1* | 6/2012 | Miyoshi | ............... | H04B 7/0413 455/501 |

FOREIGN PATENT DOCUMENTS

| | | |
|---|---|---|
| JP | 2013118619 | 6/2013 |
| WO | WO2012033887 | 3/2012 |

* cited by examiner

Base station

Distributed antenna port

User terminal $P = \{p1, p2, p3, p4\}$
$= \{p12, p21, \boxed{p32,} p43\}$ equal to or less than each element P

Fig. 8B

Algorithm 1 Algorithm for maxmin SINR in multicellular RRH networks

1. Set $t_{min} = 0$, $t_{max} = P\frac{\max_{i,j}|h_{ij}|^2}{\min_i \sigma_i^2}$, $t = (t_{min} + t_{max})/2$;

2. Solve (2);

if (2) is infeasible then $t_{max} = t, t = (t_{min} + t_{max})/2$;

else if The solution of (2) has more than one nonzero entries in $p_{im}$, $\forall i = 1, \cdots, K$ then Solve (3);

if (3) is infeasible then $t_{max} = t, t = (t_{min} + t_{max})/2$;

else $t_{min} = t, t = (t_{min} + t_{max})/2$;

end if else $t_{min} = t, t = (t_{min} + t_{max})/2$;

end if

3. Goto 2.

BASE STATION, USER TERMINALS AND WIRELESS COMMUNICATION METHOD

TECHNICAL FIELD

This invention relates to a base station, a user terminal, and a wireless communication method applicable to the next generation communication system.

BACKGROUND

In a UMTS (Universal Mobile Telecommunications System) network, long-term evolution (LTE) was specified for the purposes of further increasing high-speed data rates, providing low delay and so on (non-patent literature 1). In LTE, as multiple access schemes, a scheme that is based on OFDMA (Orthogonal Frequency Division Multiple Access) is used on downlink channels (downlink), and a scheme that is based on SC-FDMA (Single Carrier Frequency Division Multiple Access) is used on uplink channels (uplink). Meanwhile, successor systems of LTE (for example, it may be referred to as LTE-Advanced or LTE enhancement (hereinafter referred to as "LTE-A")) has been considered and specified for the purpose of achieving further broadbandization and increase in speed beyond LTE.

Moreover, in a future wireless communication system, application of a (RRH) Remote Radio Head system with each base station unit comprising a plurality of antenna apparatuses (for example, antenna ports) in geographically distant locations has been discussed (see FIG. 1). In the RRH system (also referred to as a distributed antenna system), as shown in FIG. 1, a plurality of distributed antennas (antenna ports) are distributed and provided respectively in each cell.

For example, in the RRH system, each antenna port is respectively constituted from one antenna, and each antenna port is arranged in geographically distant locations. By this means, it becomes possible for the user terminals located in each cell to transmit and receive data with the adjacent antenna ports of a plurality of transmit antenna ports, and therefore constraining propagation loss (path loss) becomes possible even if they are located in the cell edge.

PRIOR ART

Non-Patent Literature

Non-patent literature 1: 3GPP TS 36.300 "Evolved UTRA and Evolved UTRAN Overall description"

SUMMARY OF INVENTION

Problems to be Solved by the Invention

As described above, in the case of applying the RRH system, generally the user terminals located in each cell respectively try to connect to the antenna port with which receiving quality (for example, SINR) is the highest. For example, each user terminal connects to the closest antenna port of the distributed and arranged antenna ports.

However, in the network configuration in which a plurality of cells adjacently arranged (multi-cellular network), there is a concern that the signal transmitted from a certain antenna port may be interference to the user terminal in adjacent cell. When the interference to the other user terminals (for example, the user terminals in adjacent cells) becomes bigger, there is a concern that the overall system throughput gets lower.

The present invention has been made in view of the above, and it aims to provide a base station, a user terminal and a wireless communication method which can inhibit the overall system throughput from degrading in the case of applying the RRH system under the circumstances of having a plurality of cells (multi-cellular environment).

Means for Solving the Problems

A base station of the present invention is directed to a base station in a RRH system in which a plurality of antenna ports distributed and arranged respectively in each cell, comprising: a selecting section configured to select the antenna ports for each user terminal to connect to, from the antenna ports of the cell in which each user terminal is located; and a power setting section configured to control a transmit power of the antenna ports; wherein the selecting section and the power setting section are configured to set predetermined conditions for a target SINR (t) of each user terminal and for the transmit power of the antenna ports, to select the antenna ports for each user terminal such that the minimum SINR value of the SINRs of the user terminals in the plurality of cells is maximized, and to control the transmit power of each antenna port.

Advantageous Effect of the Invention

According to the present invention, in the case of applying the RRH system under the circumstances of having a plurality of cells (multi-cellular environment), it is possible to inhibit the overall system throughput from degrading by maximizing the lowest SINR among the SINRs of each user terminal.

BRIEF DESCRIPTION OF THE DRAWING

FIG. 8B is a diagram to show an example of algorithm which is applicable in the operation of the base station according to the embodiment.

DESCRIPTION OF THE EMBODIMENTS

First, the RRH system which is applicable in the embodiment is discussed with reference to FIG. 2. Note that FIG.

2 is an example of the RRH system which is applied in a multi-cellular environment, and in the embodiment, the number of cells per one cluster, and the number of antenna ports (AP) of each cell and so on are not limited thereto.

Figure 2:
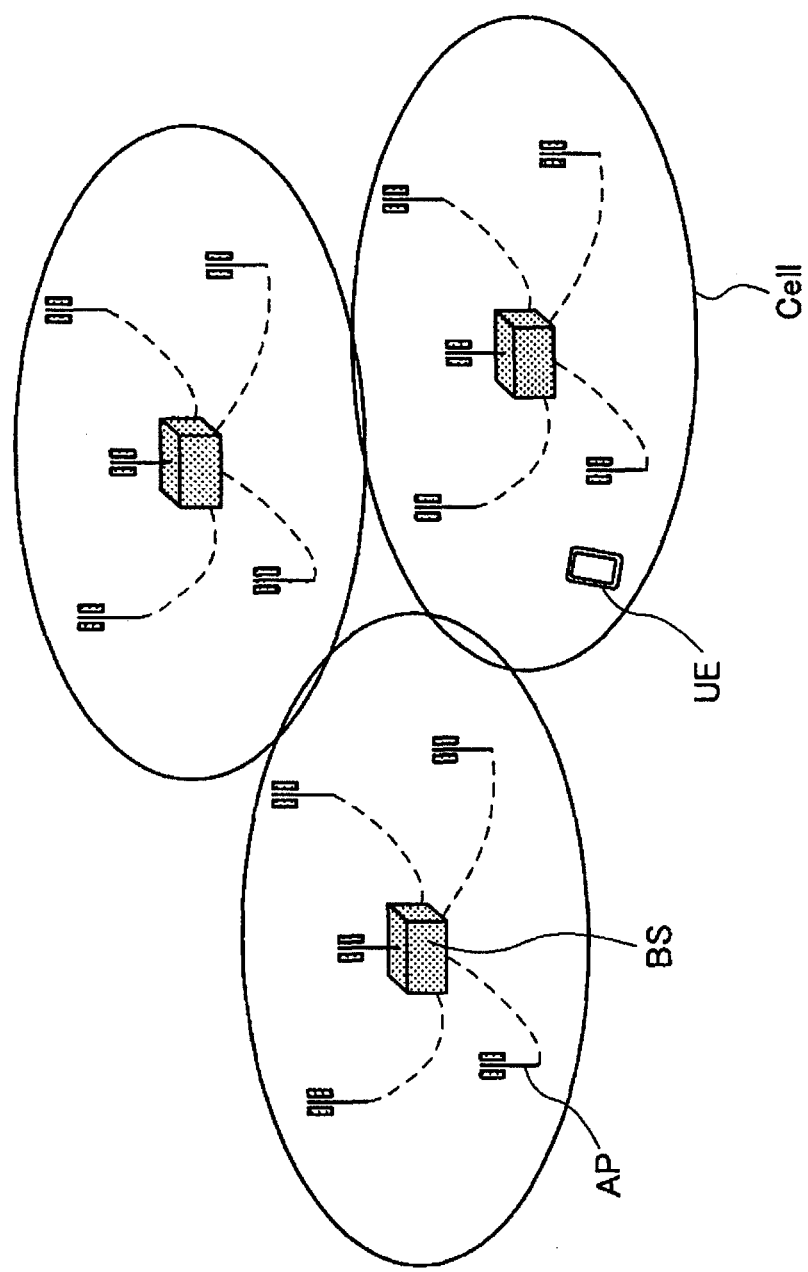
FIG. 2 is a diagram to show an example of the RRH (distributed antennas) system under the multi-cellular environment to apply in the embodiment.

FIG. 2 shows a case where three cells (Cell) form one cluster and four antenna ports (distributed antennas) are provided respectively in each cell. The radio base stations (BS) which form each cell and the distributed antennas which are arranged in said cells may be configured to connect via backhaul link, such as optical fiber and so on. Note that the radio base station may be configured to comprise the antenna (antenna port) which uses the same frequency as the distributed antenna. In this case, the number of antenna ports in each cell is five.

The RRH system shown in FIG. 2 is different from the network configuration which the radio base station is arranged only in the center of the cell and transmits and receives signals, it is which the antenna ports are distributed and arranged over the entire coverage. For this reason, even if the user terminal (UE) is located in the cell edge, the user terminal is arranged in the location adjacent to any one of the antenna ports.

Meanwhile, in the RRH system as shown in FIG. 2, the user terminals in each cell is usually connected to the antenna ports which receiving quality (for example, SINR) becomes the highest. For example, in a case shown in FIG. 3, the user terminal 1 (UE1) located in the cell 1 (Cell 1) is connected to the antenna port 1 (AP1) with which receiving quality is the highest (for example, the distance is the closest) of the a plurality of antenna ports which is arranged in the cell 1.

For example, using the SINR computed by using the following equations (1) as the receiving quality, it controls so that each user terminal is connected to the antenna ports with which said SINR becomes the highest.

$$SINR_i = \frac{p_{i,c(i)}|h_{i,c(i)}|^2}{\sum_{j=1}^{LM}\sum_{k \neq i} p_{kj}|h_{ij}|^2 + \sigma_i^2} \quad \text{Eq (1)}$$

Figure 3:
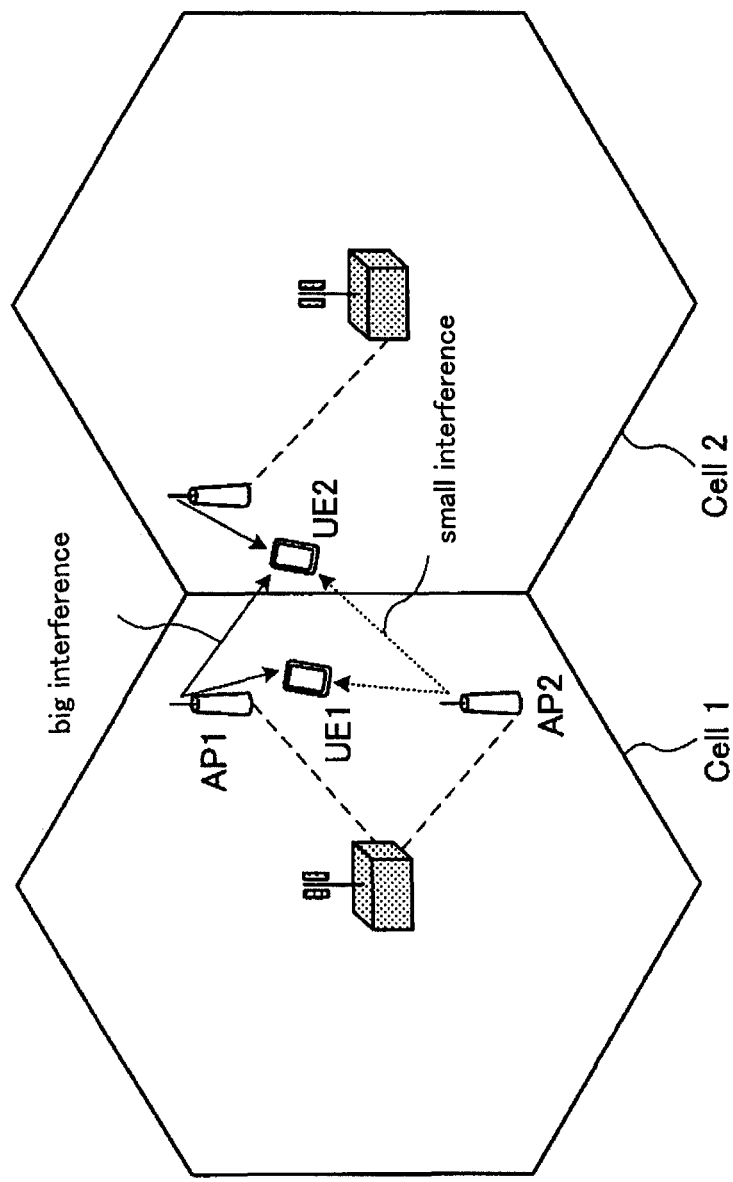
FIG. 3 is a diagram to explain the interference between adjacent cells in the RRH system under the multi-cellular environment.

L: The number of cells per cluster
M: The number of antenna ports (distributed antennas) per cell
LM: The entire number of antennas (j=0~LM-1)
K: The number of user per cluster (i=0~K-1)
$h_{ij}$: Transmission channel between the antenna j and UE i
$p_{kj}$: Transmit power in a case where it is transmitted from the antenna j to UE k
c(i): Serving cell index of UE i
$\sigma_i^2$: Noise power However, as shown in FIG. 3, in a case where the user terminal 1 is connected to the antenna port 1 (AP1) with which the SINR becomes the highest, there is a concern that the signal transmitted from the antenna port 1 to the user terminal 1 may be a big interference to the user terminal 2 located in the cell 2 (Cell 2). As such, even if each user terminal is connected to the antenna ports with the highest SINR, it will become a source of interference for the user terminal in adjacent cell, and as a result the overall system throughput will degrade.

Meanwhile, the inventors of the present invention found out that, in the case shown in FIG. 3, by connecting the user terminal 1 (UE 1) to the antenna port 2 (AP 2) with which interference to the user terminal 2 (UE 2) in the adjacent cell is small not to the antenna port 1 with the highest SINR, the receiving quality of the user terminal 1 degrades to certain extent but the overall system throughput may be improved. In this manner, the inventors of the present invention found out that, in the multi-cellular RRH system, selecting the antenna port with which the SINR became the highest for each user terminal may not always be the optimal selection when taking into account the whole cluster (for example, adjacent cells).

Then, the inventors of the present invention conceived, in the RRH system of the multi-cellular environment, not to connect each user terminal to the antenna port with the highest SINR, but to select the antenna port for each user terminal to connect to such that the lowest SINR value of the SINRs of the plurality of the user terminals is maximized and to control the transmit power of said antenna port. By performing the antenna port selection for each user terminal and transmit power control such that the lowest SINR value of the SINRs of the plurality of the user terminals is maximized (max-min), it becomes possible to guarantee the minimum quality for the plurality of user terminals also including adjacent cells.

Specifically, the predetermined conditions for the target SINR of each user terminal, the transmit power value per each antenna port, and the transmit power value of the antenna port for each user terminal, and so on, are set respectively. And the antenna port for each user terminal to connect to and the transmit power of said antenna port are jointly controlled so that the predetermined conditions are satisfied. That is, the base station uses the linear programming method, selects the antenna ports for each user terminal and controls the transmit power of said antenna port. Note that the antenna port selection and the transmit power control may be performed for every predetermined cycle, and it is also possible to perform based on the communication environment change (throughput degration).

The selection method of the antenna port for each user terminal to connect to, and the transmit power method of said antenna port are explained in the below. Note that in the following explanation, a scenario is supposed where a plurality of user terminals is located in each cell respectively, and each user terminal respectively comprises single antenna and is connected to the single antenna port in the serving cell. In this scenario, it becomes possible to simplify the synchronous procedure of the user terminals in each cell. Of course, the configuration to which the embodiment is applicable is not necessarily limited thereto.

Moreover, the plurality of user terminals located in each cell is simultaneously allocable to the same resource block. Furthermore, each user data is only available in the serving cell and it assumes a case where the user data exchange among different cells is not taken into consideration. Of course, the form of the embodiment is not limited thereto.

<The Antenna Port Selection Method>

The base station selects the antenna port for each user terminal in a cluster respectively to connect to. Note that the base station of the embodiment may be a base station which aggregates the information at the radio base stations of each cell which forms a cluster. For example, the radio base station which is to be a representative one among the radio base stations of each cell, or the centralized station which is connected with each radio base station may be a base station.

The base station selects the antenna port for each user terminal to connect to, such that a sum of the transmit power of each cell (for example, cell m) is respectively minimized, under the predetermined conditions. For the predetermined conditions, the conditions are set respectively for the target SINR of each user terminal (t), the transmit power value per each antenna port, and the transmit power value of the antenna port to each user terminal. For example, the conditions may be set where the SINRs of each user terminal is equal to or more than the predetermined SINR (target SINR (t)), a sum of the transmit power for the user terminals of each antenna port is equal to or less than the predetermined value (for example, the maximum transmit power P per antenna port), and a sum of the transmit power of each antenna port to each user terminal is equal to or less than the predetermined value (for example, the maximum transmit power P).

For example, the base station selects the antenna port for each user terminal to connect to by exploiting the following equation (2).

$$\min_{\{p_{im}\}} \sum_i \|p_{im}\|_1 \qquad \text{Eq (2)}$$

subject to $$SINR_i = \frac{p_{im}^T g_{im}}{\sum_{i=1}^{L} \sum_{k \neq i} p_{i1}^T g_{i1} + \sigma_i^2} \geq t,$$

$$\forall_i \in \{1, \ldots, K\}$$

$$\sum_{i=1}^{K} p_{im} \leq P1,$$

$$\forall_m \in \{1, \ldots, L\}$$

$$\|p_{im}\| \leq P,$$

$$\forall_i \in \{1, \ldots, K\}$$

$p_{im}$: A vector which shows the power allocation for the antenna port of the cell m which transfer data to the user terminal i
$g_{im}$: Channel strength between the cell m and the user terminal i $([|h_{i,(m-1)M+1}|^2, \ldots, |h_{i,mM}|^2]^T)$ L: The number of cells per cluster
K: The number of users per cluster (i=0~K−1)
$\sigma_i^2$: Noise power
t: Target SINR
P: Maximum transmit power
P1: [P, P, P, . . . ]

In the above equation (2), $\|p_{im}\|$ corresponds to the total sum of the transmit power of each antenna port of the serving cell m for the user terminal i. In the equation (2), the linear programming method is employed where it assumes that the SINRs of each user terminal is equal to or more than the target SINR (t) (condition 1), a sum of the transmit power for the user terminals of each antenna port is equal to or less than the predetermined value (condition 2), and a sum of the transmit power of each antenna port to each user terminal is equal to or less than the predetermined value (condition 3).

Figures 4A, 4B:
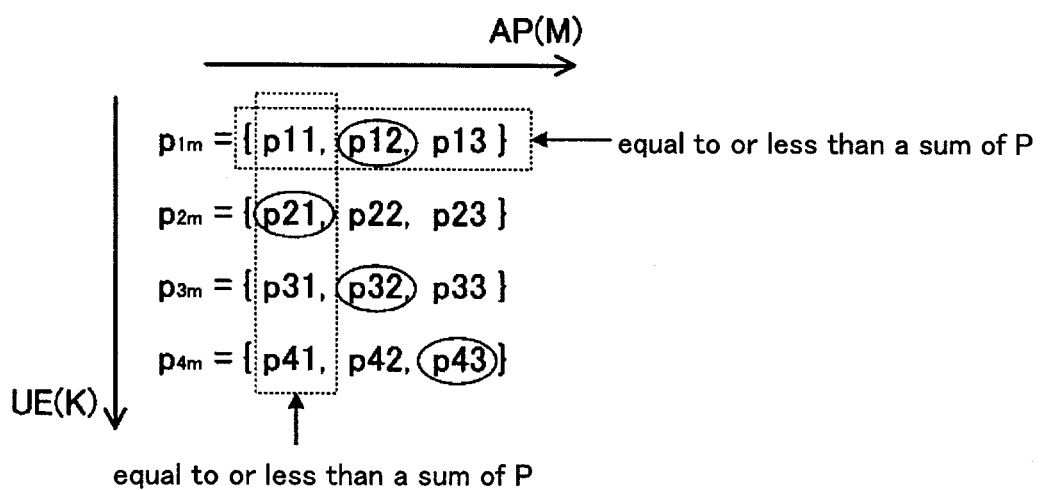
FIG. 4 is a diagram to show an example of the allocation of the antenna port to each user terminal and setting method of the transmit power of the antenna port.

FIG. 4A shows the conceptual diagram of the antenna port selection for each user terminal in the use of the above equation (2). In FIG. 4A, the antenna port (M) in a lateral direction and the user terminal (K) in a longitudinal direction are set and here it shows the case supposing where the number of antenna ports is 3, and the number of user terminals is 4.

The base station assumes the transmit power of each antenna port such that a sum of transmit power for the user terminal of each antenna port is equal to or less than the predetermined value (condition 2), and a sum of transmit power of each antenna port for each user terminal is equal to or less than the predetermined value (condition 3). Then, the antenna port is selected with which transmit power becomes the highest (SINR becomes the highest) for every user terminal. In FIG. 4A, it shows a case where the antenna ports 2, 1, 2, and 3 (a vector p12, p21, p32, p43) are selected for the user terminals 1-4, respectively.

Thus, by exploiting the above equation (2), the base station can select the specific antenna port of the serving cell for the user terminal of each cell.

<The Antenna Port Transmit Power Setting Method>

Next, the base station controls the transmit power of the selected antenna port for every user terminal. Specifically, the transmit power of the antenna port is controlled such that each element of the selected vector p=[p12, p21, p32, p43] is equal to or less than the predetermined value (for example, the maximum transmit power P).

The base stations controls, for example by exploiting the following equations (3), the transmit power of the antenna port for the user terminal to connect to (see FIG. 4B).

$$\min_p \|p\|_1 \qquad \text{Eq (3)}$$

subject to $$SINR_i = \frac{p_i g_i}{\sum_{k \neq i} p_k g_k + \sigma_i^2} \geq t,$$

$$\forall_i \in \{1, \ldots, K\}$$

$$p \leq P1$$

p: Transmit power vector after selecting antenna
g: Channel strength between the serving antenna port and the user terminal i
$\sigma_i^2$: Noise power
t: Target SINR
K: The number of user per cluster (i=0~K−1)
P1: [P, P, P, . . . ]
P: Maximum transmit power As stated above, in the embodiment, the antenna ports for each user terminal to connect to and the transmit power of said antenna ports are jointly controlled by using the conditions specified in the above equations (2) and (3) (linear programming method) such that the lowest SINR value of the SINRs of each user terminals is to become maximized. By this means, even if it is a case where the RRH system is applied in the network environment which is made of a plurality of cells, the interference to the adjacent cell is reduced and it becomes possible to guarantee the minimum quality for the user terminal in a cluster (max-mini).

Note that, in this embodiment, in order to specify the maximum value of the target SINR (t) which is realizable in the system, a bisection search method may be applicable. For example, as a target SINR (t), first the average value (t=($t_{min}$+$t_{max}$)/2) of the maximum value ($t_{max}$) and the minimum value ($t_{min}$) of SINRs is set. Minimum value ($t_{min}$) may be for example, 0. Then, using the set target SINR (t), the calculation is performed based on the conditions specified by the above equations (2) and (3) (linear programming method) and judges whether it is feasible or not (t is suitable or not). If feasible, increase the value of t by further using the bisection method, and if not feasible, it decreases the value of t and the calculation is repeatedly performed. By this means, the optimal target SINR (Max SINR) is found and the antenna port selection for a user terminal and transmit power control of said antenna port can be appropriately performed.

(Configuration of the Wireless Communication System)

Hereafter, the wireless communication system according to the embodiment is explained in detail.

Figure 5:
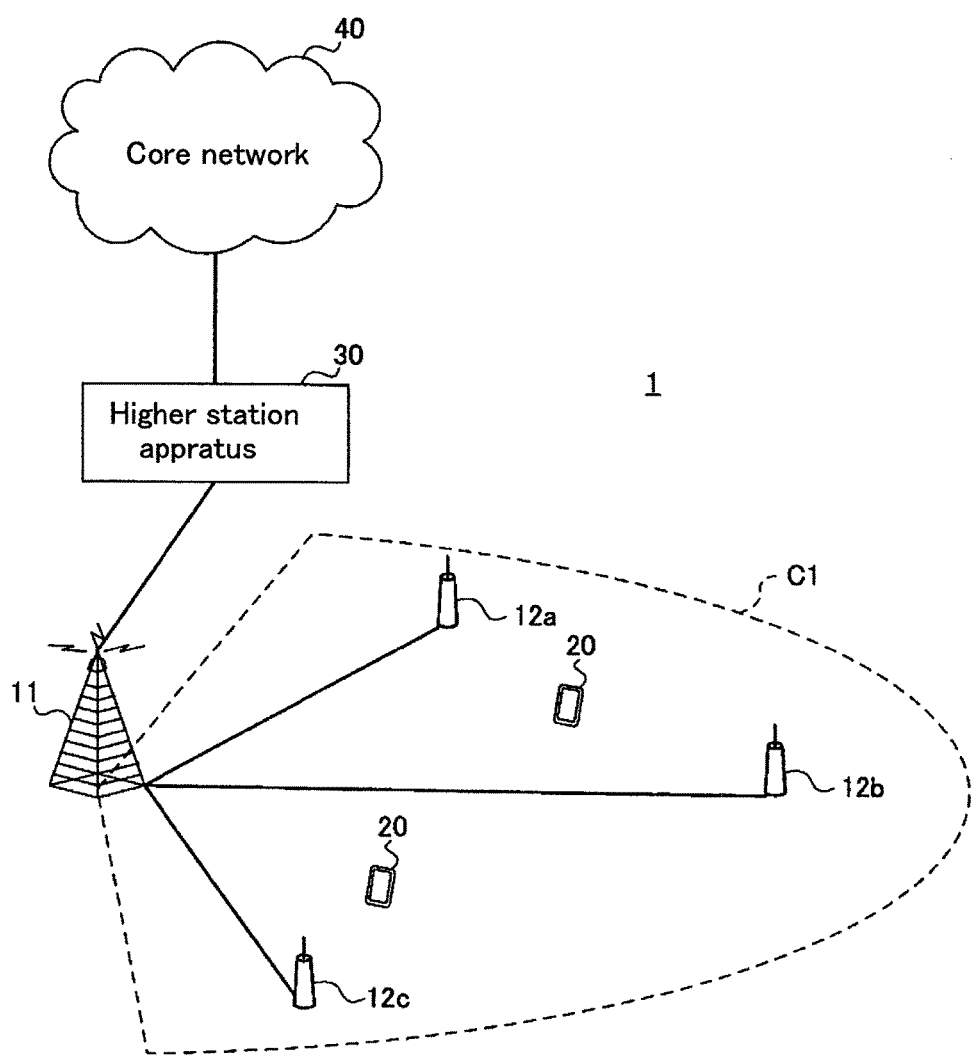
FIG. 5 is a schematic diagram to show an example of the wireless communication system according to the embodiment.

FIG. 5 is the schematic block diagram of the wireless communication system according to the embodiment. Note that the wireless communication system shown in FIG. 5 is a system which encompasses for example a LTE system or SUPER 3G and so on. In this wireless communication system, carrier aggregation (CA) integrating a plurality of frequency block (component carrier) which has a system bandwidth of LTE system as one unit, may be applied. Moreover, this wireless communication system may be referred to as IMT-Advanced or may be referred to as 4G and FRA (Future Radio Access).

Figure 1:
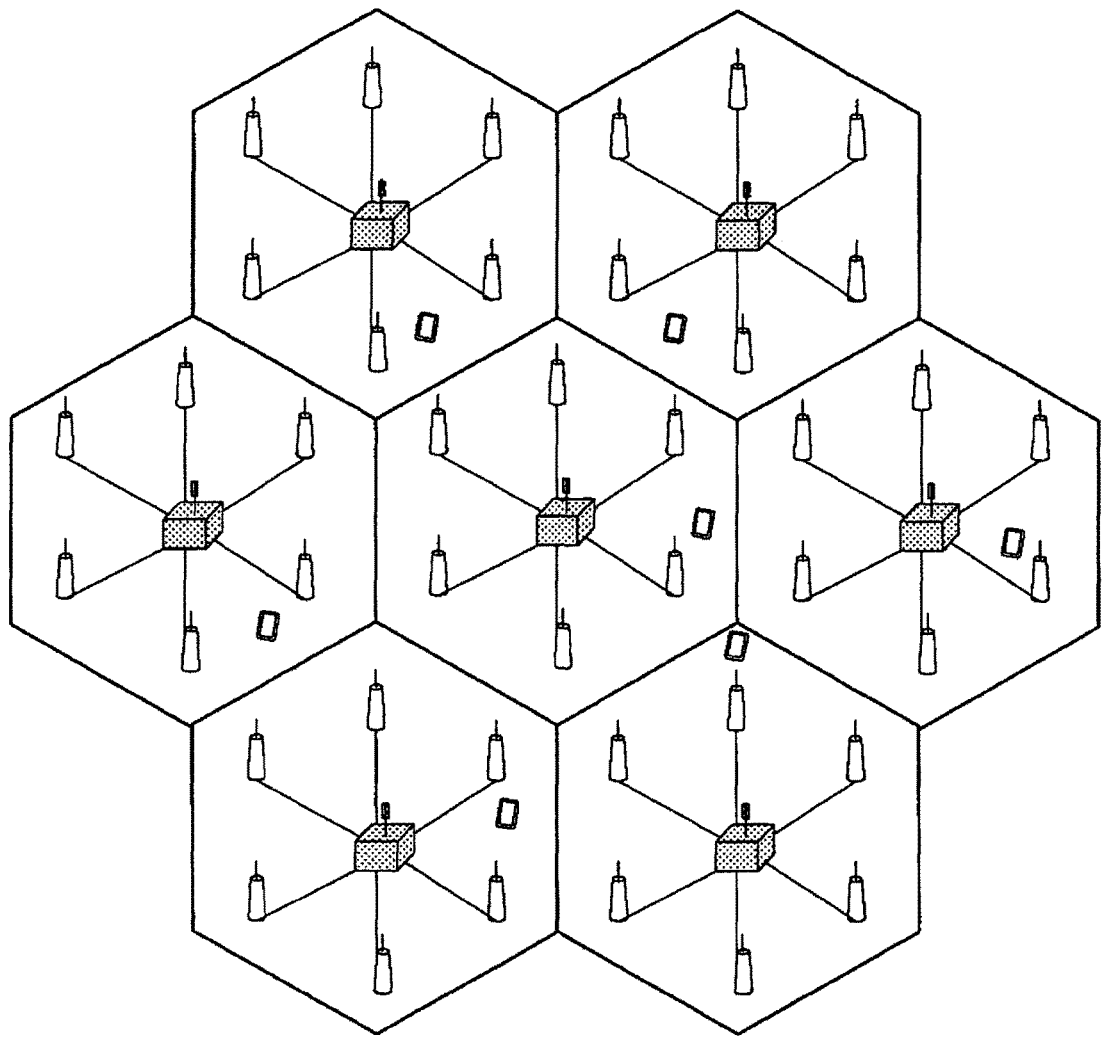
FIG. 1 is a diagram to show an example of the RRH (distributed antennas) system.

The wireless communication system 1 shown in FIG. 5 comprises a radio base station 11 which forms a macro cell C1, and a plurality of antenna ports (distributed antennas) 12a-12c arranged within the macro cell C1. Moreover, in the wireless communication system 1 as shown in the above FIG. 1, the plurality of the cell constitutes one cluster (multi-cellular RRH system). Each user terminal 20 may be configured to connect to the antenna port (for example, single antenna port) arranged in the serving cell and perform signal transmission and reception.

It is connected via wired connection (optical fiber and so on) between the radio base station 11 and the antenna port 12.

The radio base station 11 is connected to a higher station apparatus 30, and is connected to a core network 40 via the higher station apparatus 30. Note that the higher station apparatus 30 includes, for example, an access gateway unit, a radio network controller (RNC), and mobility management entity (MME) and so on, but is not always limited thereto. Moreover, each antenna port 12 is connected to the higher station apparatus via the radio base station 11, and scheduling control at each antenna port 12 may be performed at the radio base station 11 (or centralized station which aggregate each radio base station 11).

Note that the radio base station 11 may be referred to eNodeB, a macro base station, a transmitting and receiving point, and so on. Moreover, the antenna port 12 is an antenna apparatus which has a local coverage, and may be referred to as RRH (Remote Radio Head), a distributed antenna, a transmitting and receiving point, and so on.

The radio base station 11 which forms each cell may be configured to connect to the base station which functions as an centralized station, respectively. Alternatively, the radio base station to be representative is provided among the radio base stations of each cell which forms cluster and it may be configured to aggregate information to said radio base station. Moreover, each user terminal 20 is a terminal supporting various communication scheme, such as LTE and LTE-A, and so on and may include not only a mobile communication terminal but a fixed communication terminal.

In the mobile communication system of this embodiment, as a radio access scheme, OFDMA (Orthogonal Frequency Division Multiplexing Access) is applied in downlink, while SC-FDMA (Single-Carrier Frequency Division Multiple Access) is applied in uplink. OFDMA is a multicarrier transmission system for dividing a frequency band into a plurality of narrow frequency bands (subcarriers), and mapping data to each subcarrier to perform communications. SC-FDMA is a single-carrier transmission system for dividing the system bandwidth into bands comprised of one or more consecutive resource blocks for each terminal so that a plurality of terminals uses mutually different bands, and thereby reducing interference among the terminals. Note that this embodiment may be applied if it is a system which applies a multi-cellular RRH system.

Here, an example of the communication channel used in the wireless communication system shown in FIG. 5 is explained. The downlink communication channel has PDSCH (Physical Downlink Shared Channel) which is shared among each user terminal 20, and down L1/L2 control channel (PDCCH, PCFICH, PHICH, enhanced PDCCH). By this PDSCH, user data and high order control information are transmitted. By PDCCH (Physical Downlink Control Channel), the scheduling information on PDSCH and PUSCH and so on, are transmitted. By PCFICH (Physical Control Format Indicator Channel), the number of OFDM symbols used for PDCCH is transmitted. By PHICH (Physical Hybrid-ARQ Indicator Channel), ACK/NACK of HARQ to PUSCH is transmitted. Moreover, by enhanced PDCCH (EPDCCH) the scheduling information on PDSCH and PUSCH, and so on, may be transmitted. This EPDCCH is frequency division multiplexed with PDSCH (downlink shared data channel).

The uplink communication channel has PUSCH (Physical Uplink Shared Channel) as uplink data channel shared among each user terminal 20, and PUCCH (Physical Uplink Control Channel) as uplink control channel. By this PUSCH, user data and high order control information are transmitted. Moreover, by PUCCH, downlink radio quality information (CQI: Channel Quality Indicator), and acknowledgement signal (ACK/NACK) and so on are transmitted. Note that, in the following explanation, the case where the radio base station 12 applies TDD is explained.

Moreover, in downlink, a reference signal (for example, a cell specific reference signal (CRS), a user specific reference signal for demodulation (DM-RS), a reference signal for channel state measurement (CSI-RS: Channel State Information-Reference Signal), and so on) are transmitted and each user terminal performs receiving power measurement and receiver processing using said reference signal. Furthermore, in uplink, SRS (Sounding Reference Signal) for channel quality measurement is transmitted from the mobile terminal device (UE: User Equipment) and the radio base station may measure the uplink channel quality based on said SRS.

Figure 6:
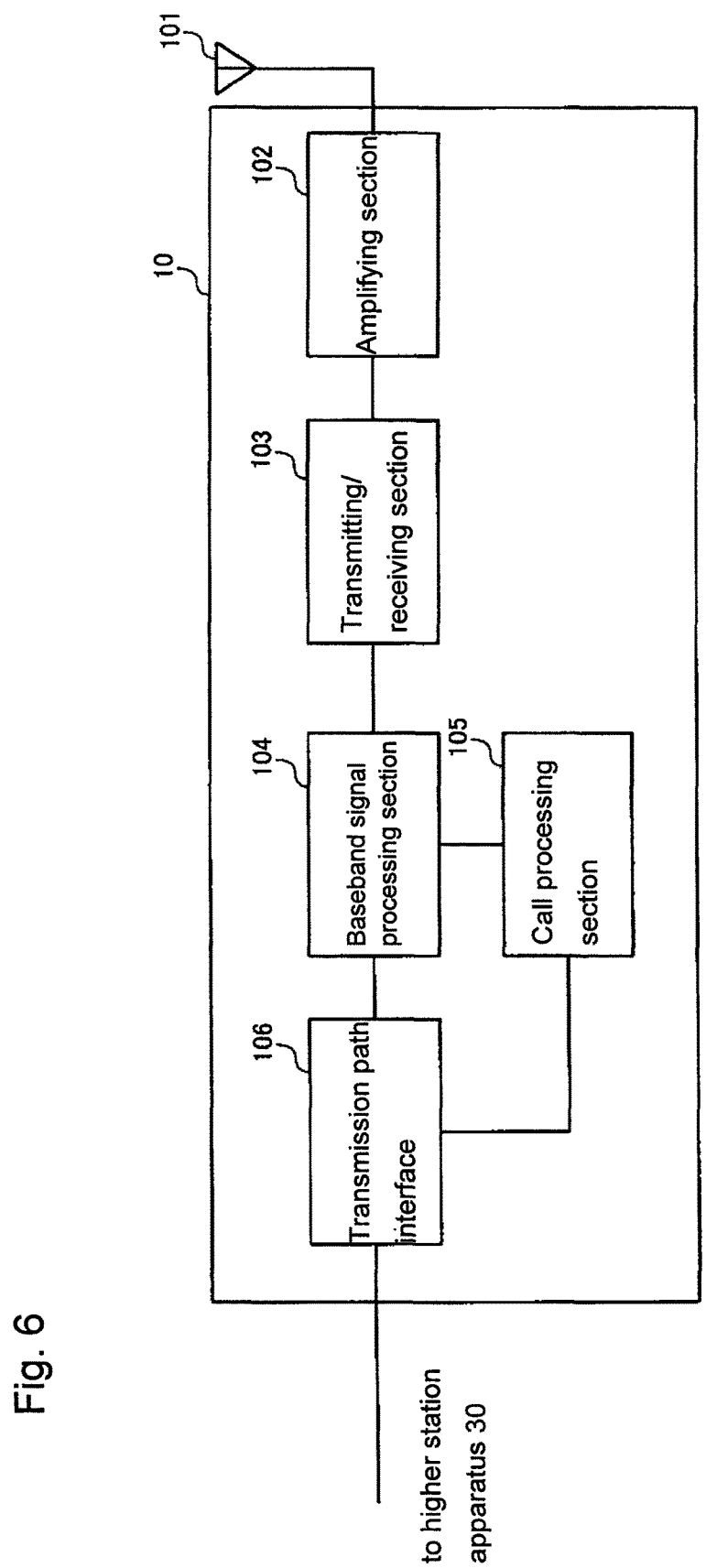
FIG. 6 is a diagram to explain the overall configuration of the base station according to the embodiment.

FIG. 6 is a diagram of the overall configuration of a base station 10 (for example, the representative radio station 11) according to the embodiment. The base station 10 comprises a transmitting and receiving antenna 101, an amplifying section 102, a transmitting and receiving section 103, a baseband signal processing section 104, a call processing section 105, and a transmission path interface 106.

The user data which is transmitted from the base station 10 to the user terminal 20 by downlink is input to the baseband signal processing section 104 via a transmission path interface 106 from the higher station apparatus 30. Moreover, the information exchange with each antenna port 12 may also be carried out via the transmission path interface 106.

In the baseband signal processing section 104, a PDCP layer process, division and coupling of user data, RLC (Radio Link Control) layer transmission processes such as an RLC retransmission control transmission process, MAC (Medium Access Control) retransmission control, for example, an HARQ transmission process, scheduling, transport format selection, channel coding, an inverse fast Fourier transform (IFFT) process, and a precoding process are performed and forwarded to each transmitting and receiving section 103. Furthermore, a signal of a downlink control channel is also subjected to transmission processes such as channel coding and an inverse fast Fourier transform and so on and is forwarded to each transmitting and receiving section 103.

Moreover, the baseband signal processing section 104 notifies the user terminal 20 of the control information for the communication in said cell by a high order layer signaling (for example, RRC signaling, broadcast information, etc.). Information for communication in said cell includes, for example, the system bandwidth in uplink or downlink and so on. Moreover, it is also possible to notify the user terminal 20 of the information about the antenna port for each user terminal to connect to by high order layer signaling.

The transmitting and receiving section 103 converts the baseband signals precoded and output from the baseband signal processing section 104 into the radio frequency bands. The amplifying section 102 amplifies and transmits the frequency converted radio frequency signals by the transmitting and receiving antenna 101.

On the other hand, for the data transmitted from the user terminal 20 to the base station 10 by the uplink, the radio frequency signals received by the transmitting and receiving antenna 101 are amplified by the amplifying section 102, and frequency converted by the transmitting and receiving section 103, and converted into the baseband signals, and input into the baseband signal processing section 104.

In the baseband signal processing section 104, FFT processing, IDFT processing, error correction decode, receiver processing of MAC retransmission control, a receiver processing for an RLC layer, and a PDCP layer are performed to user data included in the input baseband signal, and they are forwarded to higher station apparatus 30 via the transmission path interface 106. The call processing section 105 performs call processing such as a communication channel setup and release and so on, state management of the base station 10, and management of a radio resource.

Figure 7:
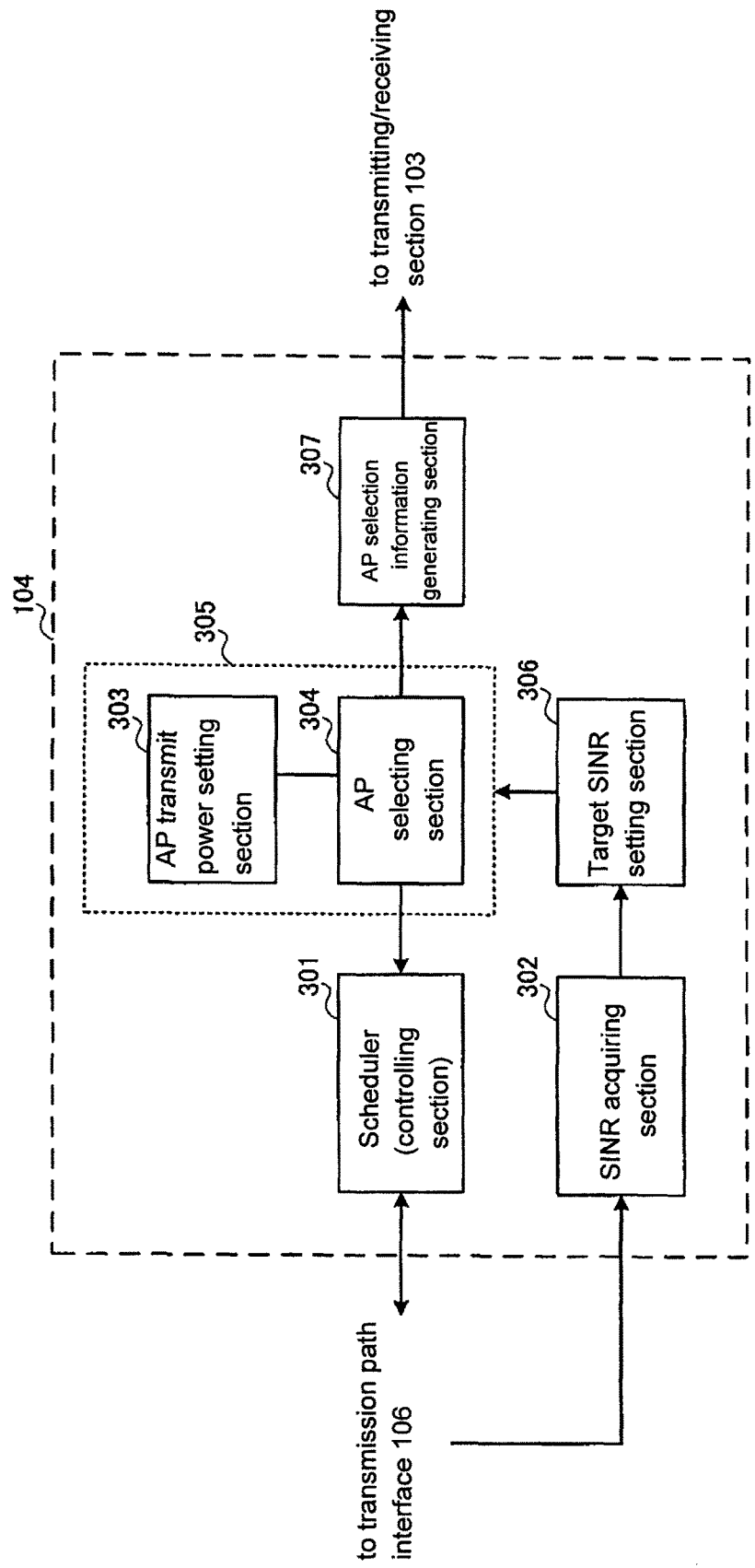
FIG. 7 is a diagram to explain functional configurations of the base station according to the embodiment.

FIG. 7 is the main functional block diagram of the baseband signal processing section 104 which the base station 10 has according to the embodiment. Noted that, in FIG. 7, it mainly shows the functional block diagram which is particularly relevant in the embodiment but the base station 10 also comprises other functional structure required for communication.

As shown in FIG. 7, the baseband signal processing section 104 which the base station 10 has, is configured to comprise a scheduler (controlling section) 301, a SINR acquiring section 302, an antenna port controlling section 305 comprising an antenna port (AP) transmit power setting section 303 and an antenna port (AP) selecting section 304, and a target SINR setting section 306 and an antenna port (AP) selection information generating section 307.

The scheduler (controlling section) 301 controls the scheduling of the downlink data signal transmitted by PDSCH, the downlink signal transmitted by the PDCCH and/or Enhanced PDCCH (EPDCCH), downlink reference signals and so on. Moreover, the scheduler 301 also performs the scheduling control (allocation control) of the uplink data transmitted by PUSCH, the uplink control information transmitted by the PUCCH or PUSCH and uplink reference signals. Information on allocation control for uplink signal (uplink control signal, uplink user data) is notified to the user terminal by using Downlink Control Signal (DCI).

Specifically, the scheduler 301 perform the radio resource allocation based on instruction information from the higher station apparatus 30, or the feedback information from each user terminal 20 (for example, CSI including CQI, RI, and so on). Moreover, the scheduler 301 also performs the scheduling of the transmitting and receiving signal at the plurality of antenna ports 12.

The SINR acquiring section 302 acquires information about SINRs of each user terminal (for example, user terminal in a cluster). For example, the SINR acquiring section 302 acquires information about SINR of each user terminal computed by exploiting the above equation (1). The target SINR setting section 306 sets the target SINR which is required for the antenna port controlling section 305. For example, the target SINR setting section 306 applies a bisection search method, sets the target SINR (t), and outputs to the antenna port controlling section 305. Note that the function of the target SINR setting section 306 may be installed in the antenna port controlling section 305.

The antenna port controlling section 305 uses the antenna port selecting section 304 and the antenna port transmit power setting section 303, selects the antenna port for each user terminal such that the lowest SINR value of the SINRs of the plurality of the user terminals is maximized (max-min) and controls the transmit power of the antenna port.

The antenna port selecting sections 304 selects the antenna ports for each user terminal to connect to such that a sum of the transmit power of each cell (for example, cell m) is respectively minimized under the predetermined conditions. For the predetermined conditions, the conditions are set respectively for the target SINR(t) of each user terminal, a sum value of the transmit power for the user terminals of each antenna port, and a sum value of the transmit power of each antenna port for each user terminal. For example, the antenna port selecting section 304 selects the antenna port for the user terminal to connects to by exploiting the above equation (2) (See the above FIG. 4A).

The antenna port transmit power setting section 303 controls the transmit power of the selected antenna port for every user terminal. For example, the antenna port transmit power setting section 303 controls the transmit power of the antenna port for user terminal to connects to by exploiting the above equation (3) (See the above FIG. 4B).

Figure 8A:
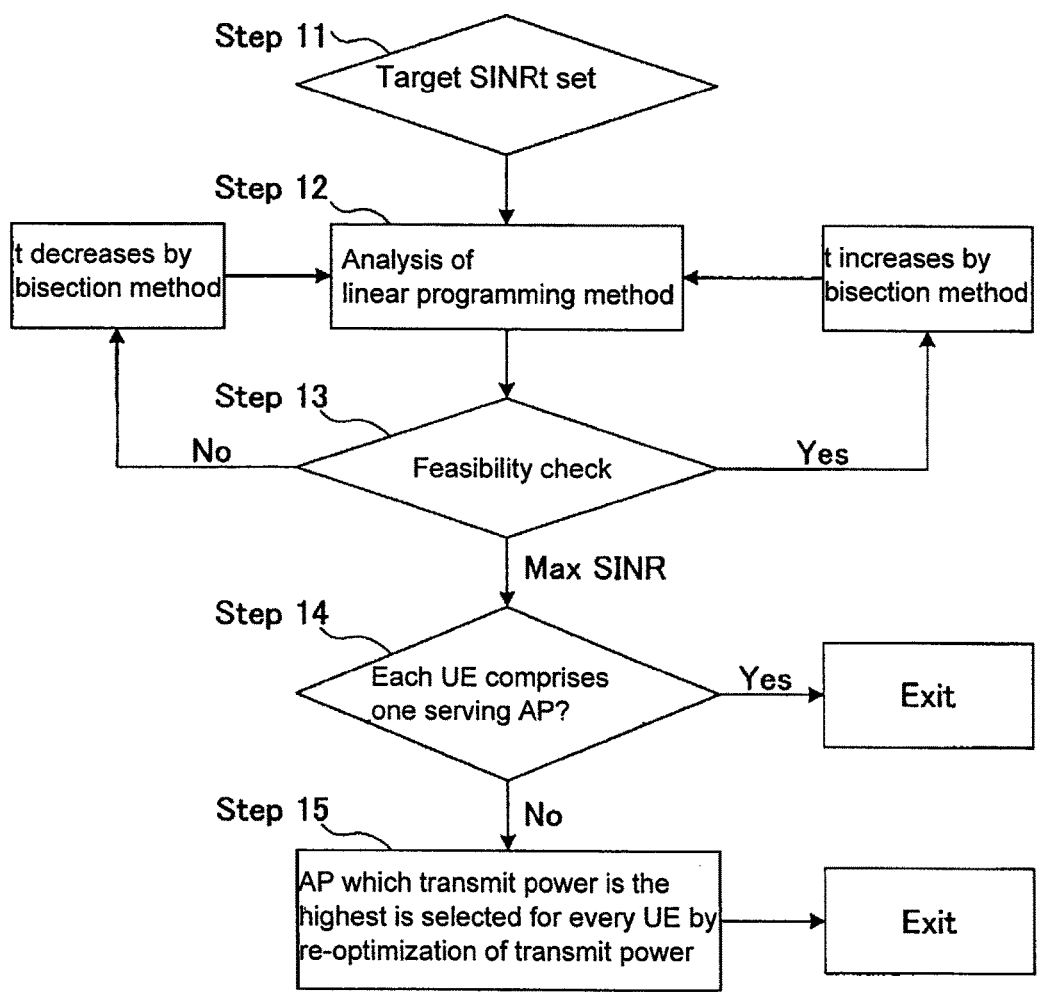
FIG. 8A is a diagram to explain an example of the operational method of the base station according to the embodiment.

FIG. 8 shows an example of operation in the antenna port controlling section 305. Note that FIG. 8A corresponds to the flow chart which shows the operational procedures for the target SINR setting section 306 and for the antenna port controlling section 305, and FIG. 8B corresponds to an example of the algorithm to apply. Note that (2) and (3) in FIG. 8B are equivalent to the above equation (2) and equation (3), respectively.

First, the target SINR setting section 306 sets the average value ($t=(t_{min}+t_{max})/2$) of the maximum value ($t_{max}$) and the minimum value ($t_{min}$) of the SINRs as a target SINR (t) (step 11). Then, the antenna port controlling section 305 performs the calculation based on the conditions specified by the above equation (2) and the equation (3) (linear-programming) using said target SINR (t) (step 12) and judge if it is feasible or not (or if t is suitable or not) (step 13). The antenna port controlling section 305, if feasible, increases the value of t by using the bisection method, if not feasible, decreases the value of t and the calculation is repeatedly performed. By this means, the optimal target SINR (Max SINR) can be found.

The antenna port controlling section 305 judges whether each user terminal respectively has only one serving AP (connection AP) (step 14). When one serving AP is allocated to each user terminal, it communicates with AP of each user terminal set in the step 13 using the transmit power of each AP. On the other hand, when one serving AP is not allocated to each user terminal, the re-optimization processing is performed and the antenna port with which the transmit power becomes the highest is selected for every user terminal (step 15).

The antenna port selecting section 304 which selected the antenna port for each user terminal in the above operation outputs the information about the antenna port selected for each user terminal, to the scheduler 301 and to the antenna port selection information generating section 307.

The antenna port selection information generating section 307 generates the information about AP corresponding to each user terminal based on the information output from the antenna port selecting section 304. Note that the information generated by the antenna port selection information generating section 307 may be notified of each user terminal including in high order layer signaling (for example, RRC signaling) and downlink control information.

Figure 9:
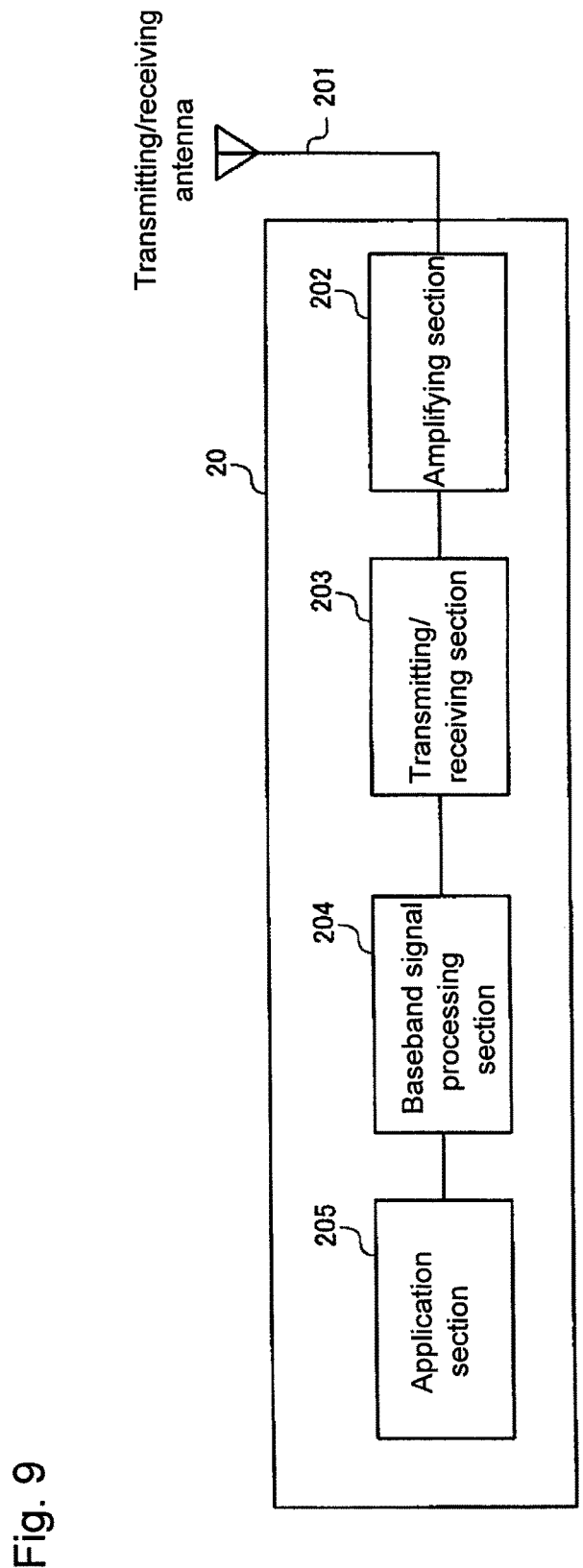
FIG. 9 is a diagram to explain the overall configuration of the user terminal according to the embodiment.

FIG. 9 is a diagram of the overall configuration of the user terminal 20 according to the embodiment. The user terminals 20 comprises a transmitting and receiving antenna 201, an amplifying section 202, and a transmitting and receiving section (receiving section) 203, a baseband signal processing section 204, and an application section 205.

For the downlink data, the radio frequency signals received by the transmitting and receiving antenna 201 are respectively amplified by the amplifying section 202, and frequency converted by the transmitting and receiving section 203, and converted into the baseband signals. These baseband signals are performed with FFT processing, and error correction decode and receiver processing of retransmission control (HARQ-ACK) and so on, by the baseband signal processing section 204. Among this downlink data, the downlink user data is forwarded to the application section 205. The application section 205 performs the processing for the higher layer than a physical layer or a MAC layer, and so on. Moreover, among the downlink data, broadcast information is also forwarded to the application section 205.

On the other hand, for the uplink user data, it is input from the application section 205 to the baseband signal processing section 204. In the baseband signal processing section 204, transmission processing of the retransmission control (HARQ-ACK), channel coding, precoding, DFT processing, and IFFT processing, and so on are performed, and it is transmitted to the transmitting and receiving section 203. The transmitting and receiving section 203 converts the baseband signals output from the baseband signal processing section 204 into the radio frequency bands. The amplifying section 202 then amplifies and transmit the frequency converted radio frequency signals by the transmitting and receiving antenna 201.

Figure 10:
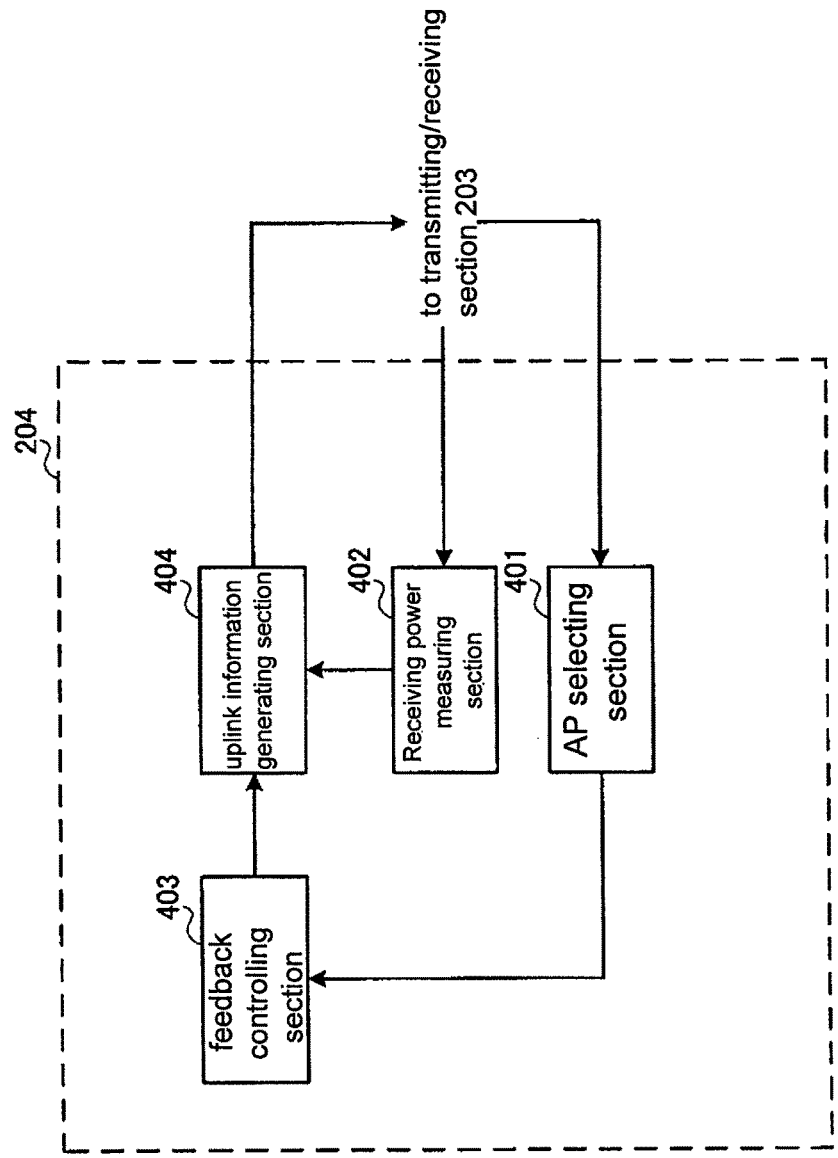
FIG. 10 is a diagram to explain functional configurations of the user terminal according to the embodiment.

FIG. 10 is the main functional block diagram of the baseband signal processing section 104 which user terminal 20 has. As shown in FIG. 10, the baseband signal processing section 204 which the user terminal 20 has comprises at least an antenna port (AP) selecting section 401, a receiving power measuring section 402, the feedback controlling section 403, and an uplink information generating section 404. Note that, as mentioned above, the baseband signal processing section 204 also has the functional section which performs channel coding, precoding, DFT processing, IFFT processing, and so on.

The antenna port selecting section 401 selects the antenna port for connection (for example, single AP) from the plurality of the antenna ports arranged in the serving cell, based on the antenna port selection information notified from the radio base station 11.

The receiving power measuring section 402 measures the receiving power (RSRP, RSRQ, and so on) of the downlink signal (for example, a reference signal) transmitted from each antenna port. The receiving power measuring section 402 may feedback the information about the measured receiving power to the radio base station via the uplink control information generating section 404. Alternatively, SINR may be computed based on the receiving power on the user terminal side and the information about said SINR may be feedback.

The feedback controlling section 403 specifies the antenna port of a feedback destination based on the information output from the antenna port selecting section 401 and controls the generation of acknowledgment signals (ACK/NACK), the allocation to a PUCCH resource, feedback timing, and so on. The uplink information generating section 404 generates the uplink signal based on the instruction from the feedback controlling section 403. The uplink signal generated by the uplink control information generating section 404 is transmitted to the antenna port selected by the antenna port selecting section 401 via the transmitting and receiving section 203.

Thus, the base station selects the AP for each user terminal to connect to such that the minimum SINR value of the SINRs of the plurality of user terminals is maximized, and transmits and receives with the specific AP based on the information about the AP of which said user terminal is notified, thereby it is possible to inhibit the overall system throughput from degrading.

Hereinabove, the present invention has been explained in detail by using the above-described embodiments; however, it is obvious for those skilled in the art that the present invention is not limited to the embodiments explained herein. The present invention may be implemented as a corrected and modified mode without departing from the gist and the scope of the present invention defined by the scope of the claims. Therefore, the description of the specification is intended for explaining the example only and does not impose any limited meaning to the present invention.

The present specification is based on the Japanese Patent Application No. 2013-156567 filed on Jul. 29, 2013. The entire contents of which are expressly incorporated by reference herein.

What is claimed is:

1. A base station in a RRH (Remote Radio Head) system with a plurality of antenna ports distributed and arranged respectively in each cell, comprising:

a selecting section configured to select the antenna ports for each user terminal to connect to, from the antenna ports of the cell in which each user terminal is located; and a power setting section configured to control a transmit power of the antenna ports;

wherein the selecting section and the power setting section are configured to set predetermined conditions for a target SINR (t) of each user terminal and for the transmit power of the antenna ports, to select the antenna ports for each user terminal such that the minimum SINR value of the SINRs of the user terminals in the plurality of cells is maximized, and to control the transmit power of each antenna port, wherein the selecting section is further configured to set the predetermined conditions respectively for the target SINR (t) of each user terminal, a sum value of the transmit power for the user terminals of each antenna port and a sum value of the transmit power of each antenna port for each user terminal, and to select the antenna ports for each user terminal such that a sum of the transmit power of each cell is respectively minimized, and wherein the selecting section is further configured to select the antenna port for each user terminal to connect to by exploiting the following equation (2):

$$\min_{\{p_{im}\}} \sum_i \|p_{im}\|_1 \qquad \text{equation (2)}$$

subject to $$SINR_i = \frac{p_{im}^T g_{im}}{\sum_{l=1}^{L} \sum_{k \neq i} p_{il}^T g_{il} + \sigma_i^2} \geq t,$$

$$\forall_i \in \{1, \ldots, K\}$$

$$\sum_{i=1}^{K} p_{im} \leq P1,$$

$$\forall_m \in \{1, \ldots, L\}$$

$$\|p_{im}\| \leq P,$$

$$\forall_i \in \{1, \ldots, K\},$$

where $p_{im}$: a vector which shows the power allocation for the antenna port of the cell m which transfers data to the user terminal i;

$g_{im}$: channel strength between the cell m and the user terminal i $([|h_{i,(m-1)M+1}|^2, \ldots, |h_{i,mM}|^2]^T)$;

L: the number of cells per cluster;
K: the number of users per cluster (i=0~K−1);
$\sigma_i^2$: noise power;
t: target SINR;
P: maximum transmit power; and
P1: [P, P, P, . . . ].

2. The base station according to claim 1, wherein said each user terminal comprises one antenna and the selecting section is further configured to allocate one antenna port to each user terminal.

3. The base station according to claim 1, wherein the plurality of cells constitute one cluster and exchange of user data is not carried out among different cells.

4. A base station in a RRH system with a plurality of antenna ports distributed and arranged respectively in each cell, comprising:

a selecting section configured to select the antenna ports for each user terminal to connect to, from the antenna ports of the cell in which each user terminal is located; and a power setting section configured to control a transmit power of the antenna ports;

wherein the selecting section and the power setting section are configured to set predetermined conditions for a target SINR (t) of each user terminal and for the transmit power of the antenna ports, to select the antenna ports for each user terminal such that the minimum SINR value of the SINRs of the user terminals in the plurality of cells is maximized, and to control the transmit power of each antenna port, wherein the power setting section is further configured to control the transmit power of each antenna port such that the transmit power of the antenna ports selected for every user terminal is equal to or less than a predetermined value, and wherein the power setting section is further configured to control the transmit power of the antenna ports by exploiting the following equation (3):

$$\min_p \|p\|_1 \qquad \text{equation (3)}$$

subject to $$SINR_i = \frac{p_i g_i}{\sum_{k \neq i} p_k g_k + \sigma_i^2} \geq t,$$

$$\forall_i \in \{1, \ldots, K\}$$

$$p \leq P1,$$

where p: a transmit power vector after selecting antenna;
g: channel strength between the serving antenna port and the user terminal i;
$\sigma_i^2$: noise power;
t: target SINR;
K: the number of users per cluster (i=0~K−1);
P1: [P, P, P, . . . ]; and
P: maximum transmit power.

5. A wireless communication method in a RRH system in which a plurality of antenna ports distributed and arranged respectively in each cell, comprising:

a step of selecting antenna ports for each user terminal to connect to, from the antenna ports of the cell in which each user terminal is located and controlling a transmit power of the antenna ports;

wherein predetermined conditions for a target SINR (t) of each user terminal and for the transmit power of the antenna ports are set, the antenna ports for each user terminal are selected such that the minimum SINR value of the SINRs of the user terminals in the plurality of cells is maximized, and the transmit power of each antenna port is controlled, wherein the predetermined conditions are set respectively for the target SINR (t) of each user terminal, a sum value of the transmit power for the user terminals of each antenna port and a sum value of the transmit power of each antenna port for each user terminal, and the antenna ports for each user terminal are further selected such that a sum of the transmit power of each cell is respectively minimized, and wherein the antenna port for each user terminal to connect to is further selected by exploiting the following equation (2):

$$\min_{\{p_{im}\}} \sum_i \|p_{im}\|_1 \qquad \text{equation (2)}$$

subject to $$SINR_i = \frac{p_{im}^T g_{im}}{\sum_{l=1}^{L} \sum_{k \neq i} p_{il}^T g_{il} + \sigma_i^2} \geq t, \forall_i \in \{1, \ldots, K\}$$

$$\sum_{i=1}^{K} p_{im} \leq P1, \forall_m \in \{1, \ldots, L\}$$

-continued $$\|p_{im}\| \le P, \forall_i \in \{1, \ldots, K\}$$

where
- $p_{im}$: a vector which shows the power allocation for the antenna port of the cell m which transfers data to the user terminal i;
- $g_{im}$: channel strength between the cell m and the user terminal i $$([|h_{i,(m-1)M+1}|^2, \ldots, |h_{i,mM}|^2]^T);$$

- L: the number of cells per cluster;
- K: the number of users per cluster (i=0~K−1);
- $\sigma_i^2$: noise power;
- t: target SINR;
- P: maximum transmit power;
- P1: [P, P, P, . . . ].

* * * * *